July 21, 1936.    A. H. HOFER    2,048,448
PEDAL CONSTRUCTION
Filed June 28, 1933    2 Sheets-Sheet 1
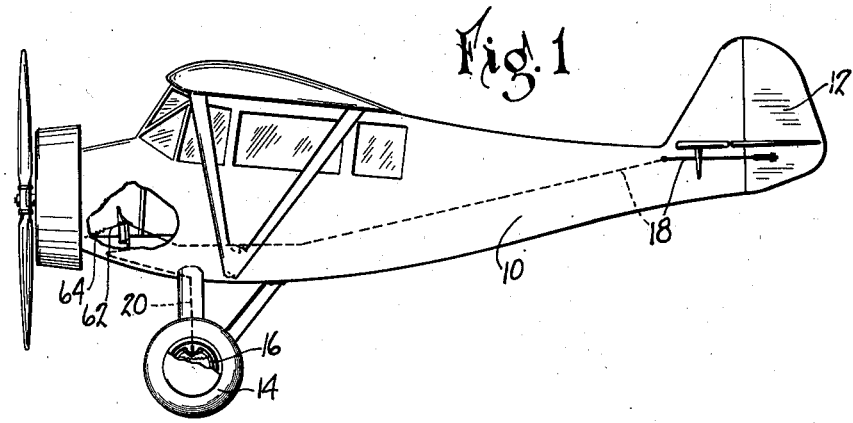
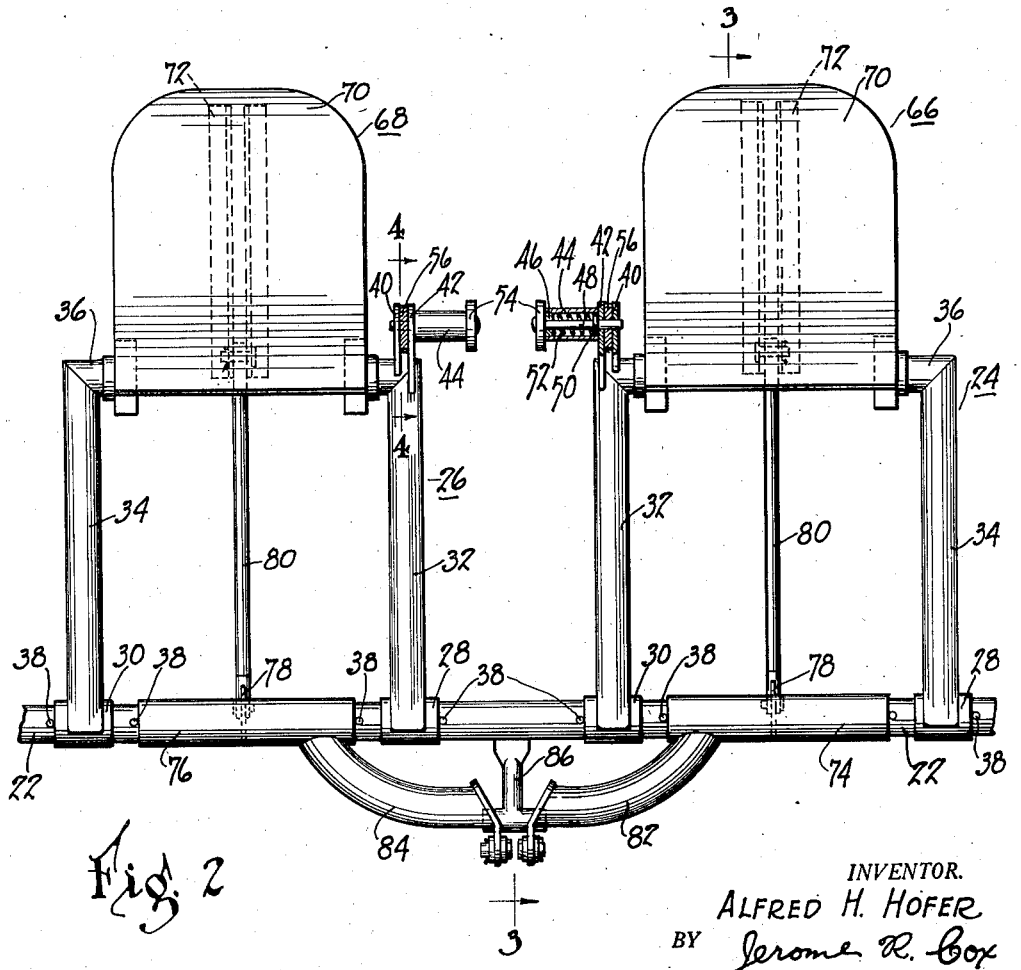
INVENTOR.
ALFRED H. HOFER
BY Jerome R. Cox
ATTORNEY.

July 21, 1936. A. H. HOFER 2,048,448
PEDAL CONSTRUCTION
Filed June 28, 1933   2 Sheets-Sheet 2
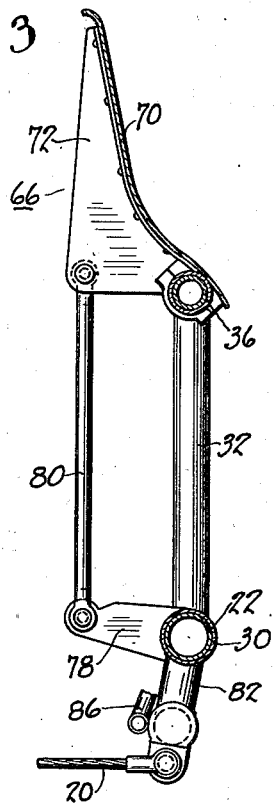
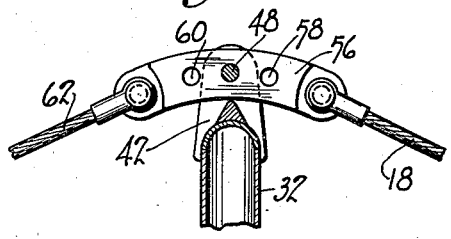
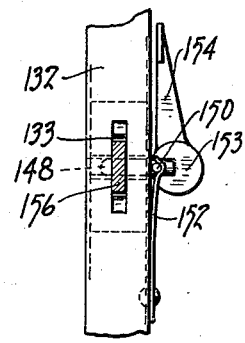
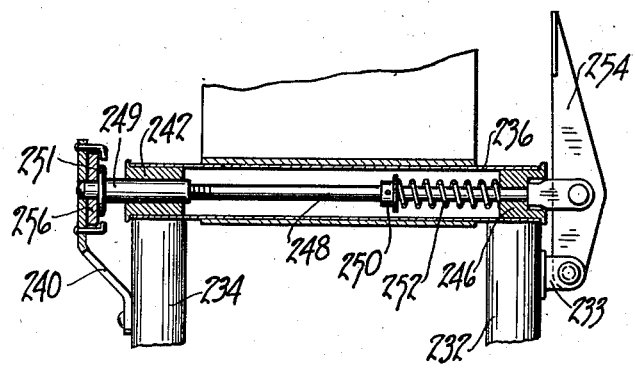
INVENTOR.
ALFRED H. HOFER
BY Jerome R. Cox
ATTORNEY.

Patented July 21, 1936

2,048,448

UNITED STATES PATENT OFFICE 2,048,448

PEDAL CONSTRUCTION

Alfred H. Hofer, Dayton, Ohio, assignor to Bendix Aviation Corporation, South Bend, Ind., a corporation of Delaware Application June 28, 1933, Serial No. 677,969

13 Claims. (Cl. 244—29)

This invention relates to aircraft controls and particularly to brake and rudder controls.

One of the objects of this invention is to provide in combination simple and efficient means for controlling the rudder and associated simple and efficient means for controlling the wheel brakes independently of each other and of the rudder.

A further object is to provide means for positioning the brake control elements when the brakes are released.

A further object is to provide simple and convenient means for adjusting the rudder cables relative to the control elements.

A feature of the invention is the arrangement of the brake control pedals on a moving portion of the rudder control pedals and the provision of parallelogram connections from the brake control pedals so that movement of the rudder pedals does not affect the brakes.

A further feature is the provision in combination with the above of a stop for the brake connections whereby the brake release springs may return the connections and the brake control pedals to a definite predetermined normal position.

A further feature is a slide and locking device by which the rudder pedal is connected to the rudder cables.

Further objects and features of the invention will be apparent after a reading of the subjoined specification and claims and after consideration of the accompanying drawings, in which:

Figure 1 is a view in side elevation of an airplane equipped with my novel brake and rudder control, a portion of the covering having been removed to show one of the pedals;

Figure 2 is a view in rear elevation showing the rudder and brake pedals on an enlarged scale and mostly in elevation but having parts shown in section;

Figure 3 is a side view in vertical section taken substantially on the line 3—3 of Figure 2;

Figure 4 is a fragmentary view in vertical section taken substantially on the line 4—4 of Figure 2;

Figure 5 is a fragmentary view in section of a modified detail; and

Figure 6 is a fragmentary view in section of another modified detail.

Referring to Figure 1 of the drawings, there is shown an airplane 10 having a rudder 12 and landing wheels such as 14. Each wheel is equipped with a brake 16.

The rudder is controlled by rudder pedals through rudder control cables such as 18 and the brake is controlled by brake pedals associated with the rudder pedals through brake control cables such as 20.

The combined brake and rudder pedals are shown most clearly in Figures 2 and 3. Secured to the frame of the airplane is a shaft 22. On this are mounted a pair of frames 24 and 26 which serve as rudder control pedals. Each frame comprises a pair of sleeves 28 and 30, a pair of tubular side elements 32 and 34 each secured to one of the sleeves and an upper tubular element 36 joining the side elements. Pins 38 secured in the shaft maintain the frames or pedals in the desired position.

As shown in Figures 2 and 4 each rudder pedal is connected to the rudder control cable by a novel slide and releasable lock arrangement. Secured at the junction between the side element 32 and the upper element 36 are a pair of plates 40 and 42, the plates being formed with aligned holes. Secured to the outer plate 42 is a tube 44 carrying at its outer end a plug 46. Extending through the plug 46 and the tube 44 is a bolt 48 having a shoulder 50 adapted normally to bear against the plate 42. Positioned between the shoulder 50 and the plug 46 is a spring 52 which urges the bolt inward. Secured to the bolt outside of the plug is a side plate 54 by means of which the pilot by a side thrust of his foot is able to move the pin outward compressing the spring.

The rudder cable 18 is connected to an arcual plate 56 formed with a series of holes such as 58 and 60. This plate extends through the space between the plates 40 and 42 and the holes 58, 60, etc. are adapted to align with the aligned holes in the plates 40 and 42. Thus the bolt 48 is normally maintained to extend through one of the holes in the arcual plate 56 and through a pair of aligned holes in the plates 40 and 42 and thus the cable 18 is adjustably secured to the rudder control pedal. The forward end of the arcual plate is connected to a cable 62 which is connected at its forward end with a spring 64. By means of this arrangement the pilot may adjust the rudder control cables to position the pedals most comfortably for him, taking into consideration the length of his legs and changes of position which he may desire from time to time.

Referring again to Figures 2 and 3, it may be seen that each rudder pedal has a brake operating pedal mounted thereon. Thus the upper tubular element of the rudder pedal 24 has the brake pedal 66 sleeved thereon and the corresponding element of the rudder pedal 26 has the brake pedal 68 sleeved thereon. The brake pedals 66 and 68 are thus mounted for rotation on the rudder pedals. Each comprises a curved foot pad 70 and a T-shaped bracing member 72 riveted thereto.

Angular movement of the brake pedals 66 and 68 is transmitted to the brake control cables by a parallelogram arrangement. Thus that there is no distortion due to the position of the rudder pedal. Sleeves 74 and 76 mounted on the shaft 22 each have secured thereto arms such as 78. Pivotally connected to the outer ends of each of these arms 78 are links 80 which extend upward and are also pivotally connected at their upper ends to the associated bracing member 72. The distance between the centers of the pivotal connections at the ends of the links 80 equals the distance between the centers of the shaft 22 and the tubular element 36. The distance between the center of the shaft 22 and the center of the pivotal connection at the lower end of each link 80 equals the distance between the center of each tubular element 36 and the center of the pivotal connection at the upper end of each link 80. Secured to the sleeves 74 and 76 are curved tubular arms 82 and 84 to the lower ends of each of which are secured one of the cables 20.

Secured to the lateral center of the shaft 22 is a tubular T-shaped stop member 86. The outer cross elements of this member is normally contacted by the levers 82 and 84 so that the brake operating pedals 66 and 68 are maintained in a predetermined definite position regardless of the position of the rudder pedals, the arms 82 and 84 being held in contact by the release springs at the brakes 16.

In the modification shown in Figure 5 the latch comprising the pin 48 is replaced by somewhat similar structure. The tubular side element 132 is formed with a slot 133 through which extends an arcual plate 156 formed with holes similar to the holes 58 and 60. A bolt 148 extends into a bore in the element 132 transverse to the slot and through one of the holes in the plate 156. A pin 150 extends transversely through the bolt 148 and eccentrically through a cam 153. The cam 153 limits the inward movement of the bolt 148 and a spring 152 bears against the pin 150 to urge the bolt inward. The cam 153 is provided with a lever 154 by means of which it may be rotated to withdraw the bolt from the holes in the plate 156 and allow adjustment of the pedal.

Another modification of the latch mechanism is shown in Figure 6. Therein the upper tubular element 236 is provided with annular plugs 242 and 246. The bolt 248 is considerably longer and extends through the member 236 and the plug 246. An extension 249 screwed onto the end of the bolt 248 extends through the plug 242. Secured to side element 234 is a bracket 240 formed with a hole into which the extension 249 normally projects. The bolt 248 is provided with an abutment 250 and a spring 252 is positioned between the abutment 250 and the plug 246. A shoulder 251 is provided on the extension 249, and positioned between the shoulder 251 and the bracket 240 is an arcual plate 256 which is secured at its rear end to one of the rudder control cables. Pivoted on a lug 233 on side element 232 is a lever 254 which is pivotally connected to the inner end of the bolt 248. Thereby the pilot may by a side movement of his foot withdraw the bolt from its locking hole.

It is believed that the operation of all three embodiments is obvious from the above description. Movement of the pedals 24 and 26 act through cables 18 to operate the rudder 12. During normal flying the brake release spring will maintain the arms 82 and 84 in contact with the stop 86 and thus maintain the pedals 66 and 68 in predetermined position. The pilot may by his toes depress the pedals 66 and 68 and thus move the arms 82 and 84 away from the stop 86. This movement exerts tension on the cables 20 and applies the brakes. Inasmuch as the pedals 66 and 68 are entirely independent the brakes may be operated concurrently with equal pressures or with any desired proportion of pressures or either one may be operated separately. Because of the parallelogram hookup, movement of the rudder pedals does not affect the brake control and equal movement of the brake pedal effects equal brake energization regardless of position of the rudder pedals.

The pilot may at any time adjust the position of the pedals relative to the cables by moving the latch lever or plate (54, 154 or 254) outward to release the connection with the cable, moving the pedal to the desired position, and releasing the latch.

It is to be understood that the above described embodiments of my invention are for the purpose of illustration only and various changes may be made therein without departing from the spirit and scope of the invention.

I claim:

1. In airplane control apparatus a rudder pedal, a brake pedal pivotally mounted thereon, a lever pivoted on the axis of the rudder pedal, and a link pivotally connecting the lever and the brake pedal having a length between pivots equal to the distance between the axes of the rudder pedal and brake pedal.

2. In airplane control apparatus a rudder, a rudder pedal for controlling said rudder, a brake, a brake pedal for controlling said brake mounted on a movable part of said rudder pedal, means for connecting said brake pedal to said brake including connections immovable during rudder operating movements of the rudder pedal except when the angle of the brake pedal is changed.

3. In airplane controls, a rudder, a rudder pedal, a connecting cable for the rudder, a plate formed with a series of holes connected to the cable, and means comprising a resiliently pressed bolt adapted to fit in any of said holes for selectively latching the rudder pedal to the member.

4. In airplane controls, a rudder, a rudder pedal, a connecting cable for the rudder, a member connected to the cable, means for selectively latching the rudder pedal to the member, and a member associated with the latching means and mounted on the rudder pedal and movable transversely by the pilot's foot for releasing the latching means.

5. In airplane controls, a rudder, a rudder pedal, a connecting cable for the rudder, a member connected to the cable, and means for selectively latching the rudder pedal to the member, said latching means including a tube mounted on the rudder pedal, and a spring pressed plunger within said tube.

6. In airplane controls, a rudder, a rudder pedal, a connecting cable for the rudder, a member connected to the cable, and means for selectively latching the rudder pedal to the member, said pedal including a tubular side element formed with a slot and with a bore transversely of the slot, and said latching means including in combination with said side element a bolt in said bore, a spring acting on said bolt, a pin through said bolt, a cam rotatably mounted on said pin, and means to rotate said cam.

7. In airplane controls, a rudder, a rudder pedal, a connecting cable for the rudder, a member connected to the cable, means for selectively latching the rudder pedal to the member, said rudder pedal including a side tubular element, an upper tubular element, and said latching means including in combination with said upper tubular element a spring pressed bolt extending through said upper element, and a lever pivotally mounted on said side element and connected to said bolt.

8. Airplane control apparatus comprising a shaft, a series of sleeves mounted on said shaft, rudder control pedals mounted on some of said sleeves, and brake control mechanisms mounted on others of said sleeves.

9. Airplane control apparatus comprising a shaft, a series of sleeves mounted on said shaft, rudder control pedals mounted on some of said sleeves, brake control mechanisms each provided with an arm and each mounted on one of the others of said sleeves, brake control pedals rotatably mounted on said rudder control pedals, and an inextensible link by which each arm is connected to the associated brake control pedal.

10. Airplane control apparatus comprising a shaft, a series of sleeves mounted on said shaft, rudder control pedals mounted on some of said sleeves, brake control mechanisms each carrying an arm and each mounted on one of the others of said sleeves, brake control pedals rotatably mounted on said rudder control pedals, and an inextensible link pivotally connected to the brake control pedal and the arm.

11. Airplane control apparatus comprising a shaft, a series of sleeves mounted on said shaft, rudder control pedals mounted on some of said sleeves, brake control mechanisms each having an arm and each mounted on one of the others of said sleeves, and a stop secured to said shaft with which said arms contact when the brakes are released.

12. Airplane control apparatus comprising a shaft, a brake, a rudder control pedal rotatably mounted on said shaft, a brake operating mechanism rotatably mounted on said shaft, and a stop member secured to said shaft with which a portion of said mechanism contacts when the brake is released.

13. Airplane control apparatus comprising a shaft, brakes, rudder control pedals rotatably mounted on said shaft, brake operating mechanisms rotatably mounted on said shaft, and a T-shaped stop member secured to said shaft with which a portion of each of said brake operating mechanisms contacts when the brakes are released.

ALFRED H. HOFER.